(12) United States Patent
Shi et al.

(10) Patent No.: US 11,475,666 B2
(45) Date of Patent: Oct. 18, 2022

(54) METHOD OF OBTAINING MASK FRAME DATA, COMPUTING DEVICE, AND READABLE STORAGE MEDIUM

(71) Applicant: Shanghai Bilibili Technology Co., Ltd., Shanghai (CN)

(72) Inventors: Yingxuan Shi, Shanghai (CN); Kangkang Zhang, Shanghai (CN); Ruoheng Liu, Shanghai (CN); Longwen Gao, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 149 days.

(21) Appl. No.: 15/931,368

(22) Filed: May 13, 2020

(65) Prior Publication Data
US 2020/0364461 A1 Nov. 19, 2020

(30) Foreign Application Priority Data

May 17, 2019 (CN) .......................... 201910413128.3

(51) Int. Cl.
*G06K 9/62* (2022.01)
*G06V 20/40* (2022.01)

(52) U.S. Cl.
CPC ............ *G06V 20/41* (2022.01); *G06K 9/629* (2013.01); *G06K 9/6256* (2013.01); *G06K 9/6292* (2013.01); *G06V 20/46* (2022.01)

(58) Field of Classification Search
None
See application file for complete search history.

(56) References Cited

U.S. PATENT DOCUMENTS

| | | | |
|---|---|---|---|
| 5,146,926 A * | 9/1992 | Cohen | G06K 9/0057 600/523 |
| 7,362,918 B2 * | 4/2008 | Herley | G06T 5/007 382/284 |
| 7,408,986 B2 * | 8/2008 | Winder | H04N 5/145 348/E7.071 |

(Continued)

FOREIGN PATENT DOCUMENTS

WO WO-2007129510 A1 * 11/2007 ............. G06T 3/403

OTHER PUBLICATIONS

Chen et al., "Rethinking atrous convolution for semantic image segmentation." arXiv preprint arXiv: 1706.05587 (2017). (Year: 2017).*

(Continued)

*Primary Examiner* — Feng Niu
(74) *Attorney, Agent, or Firm* — BakerHostetler

(57) ABSTRACT

The present disclosure describes techniques for generating a mask frame data segment corresponding to a video frame. The disclosed techniques include obtaining a frame of a video; identifying a main area of the frame using an image segmentation algorithm; and generating a mask frame data segment corresponding to the frame based on the main area of the frame, wherein the generating a mask frame data segment corresponding to the frame based on the main area of the frame further comprises generating the mask frame data segment based on a timestamp of the frame in the video, a width and a height of the main area of the frame.

16 Claims, 9 Drawing Sheets

--- performing feature map extraction on the at least one frame image of the video through each of feature extraction models separately — A1-1-1

↓ fusing feature maps output from each of the feature extraction models step by step, and fusing the feature maps finally output from all of the feature extraction models by the at least one feature enhancement layer to generate a comprehensive feature map — A1-1-2

↓ obtaining the main area by the classification layer according to a pixel prediction semantic segmentation result corresponding to the comprehensive feature map — A1-1-3

(56) References Cited

U.S. PATENT DOCUMENTS

| | | | | |
|---|---|---|---|---|
| 8,903,167 | B2* | 12/2014 | Kohli | G06K 9/6256 |
| | | | | 382/284 |
| 10,049,308 | B1* | 8/2018 | Dhua | G06T 7/155 |
| 10,560,502 | B2 | 2/2020 | Kieft et al. | |
| 10,671,855 | B2* | 6/2020 | Lee | G06V 10/25 |
| 11,037,031 | B2* | 6/2021 | Guo | G06K 9/6267 |
| 11,062,454 | B1* | 7/2021 | Cohen | G01S 13/865 |
| 11,176,381 | B2* | 11/2021 | Lee | G06K 9/6256 |
| 2004/0252230 | A1* | 12/2004 | Winder | G06T 5/002 |
| | | | | 348/E7.071 |
| 2004/0264806 | A1* | 12/2004 | Herley | G06T 5/50 |
| | | | | 382/284 |
| 2006/0051064 | A1 | 3/2006 | Bray | |
| 2007/0183661 | A1* | 8/2007 | El-Maleh | G06V 40/162 |
| | | | | 382/173 |
| 2007/0183662 | A1* | 8/2007 | Wang | G06T 7/194 |
| | | | | 375/E7.076 |
| 2007/0268394 | A1 | 11/2007 | Nonaka et al. | |
| 2008/0144952 | A1* | 6/2008 | Chen | H04N 19/93 |
| | | | | 375/E7.076 |
| 2008/0266321 | A1 | 10/2008 | Aufranc et al. | |
| 2012/0288186 | A1* | 11/2012 | Kohli | G06K 9/6255 |
| | | | | 382/159 |
| 2013/0011049 | A1 | 1/2013 | Kimura | |
| 2013/0057924 | A1* | 3/2013 | Genda | G06T 7/155 |
| | | | | 358/3.27 |
| 2013/0063736 | A1 | 3/2013 | Chiba | |
| 2013/0216137 | A1* | 8/2013 | Washio | G06T 5/008 |
| | | | | 382/199 |
| 2015/0172669 | A1* | 6/2015 | Nishiyama | H04N 19/59 |
| | | | | 375/240.08 |
| 2015/0222861 | A1* | 8/2015 | Fujii | H04N 5/232933 |
| | | | | 348/143 |
| 2016/0132755 | A1* | 5/2016 | Ikeda | G06V 30/194 |
| | | | | 382/159 |
| 2016/0301941 | A1* | 10/2016 | Chono | H04N 19/103 |
| 2017/0109881 | A1* | 4/2017 | Avendi | G06V 10/454 |
| 2018/0041796 | A1* | 2/2018 | Huang | H04N 21/812 |
| 2018/0191987 | A1* | 7/2018 | Cao | G06V 20/41 |
| 2018/0268548 | A1* | 9/2018 | Lin | G06N 3/0454 |
| 2018/0315188 | A1* | 11/2018 | Tegzes | G06T 7/0012 |
| 2019/0087999 | A1 | 3/2019 | Maiyuran et al. | |
| 2019/0311202 | A1* | 10/2019 | Lee | G06K 9/627 |
| 2019/0355119 | A1* | 11/2019 | Hu | G06T 7/194 |
| 2020/0058270 | A1* | 2/2020 | Li | H04N 21/4312 |
| 2020/0250436 | A1* | 8/2020 | Lee | G06K 9/627 |
| 2020/0288186 | A1* | 9/2020 | Sun | H04N 21/4318 |
| 2020/0380675 | A1* | 12/2020 | Golden | G16H 30/40 |
| 2021/0365165 | A1* | 11/2021 | Chen | G06F 3/04886 |

OTHER PUBLICATIONS

Liu et al., "Learning to detecta salient object." IEEE Transactions on Pattern analysis and machine intelligence 33, No. 2 (2010): 353-367. (Year: 2010).*

Chen et al, "Semantic image segmentation with deep convolutional nets and fully connected CRFs," arXiv:1412.7062v4, Jun. 7, 2016 (Year: 2016).*

Shetty et al., "Frame-and segment-level features and candidate pool evaluation for video caption generation." In Proceedings of the 24th ACM international conference on Multimedia, pp. 1073-1076. 2016. (Year: 2016).*

Hou et al., "Normalized distance aggregation of discriminative features for person reidentification." Journal of Electronic Imaging 27, No. 2 (2018): 023006. (Year: 2018).*

Pouyanfar et al., "Automatic video event detection for imbalance data using enhanced ensemble deep learning." International Journal of Semantic Computing 11, No. 01 (2017): 85-109. (Year: 2017).*

Baketai., "Two-stream convolutional networks for dynamic saliency prediction." arXiv preprint arXiv: 1607.04730 2, No. 3 (2016): 6. (Year: 2016).*

Wikipedia, "BMP file format", May 16, 2019 (Year: 2019).*

* cited by examiner identifying a main area of at least one frame image in a video by an image segmentation algorithm — A1 generating mask frame data according to the main area — A2

METHOD OF OBTAINING MASK FRAME DATA, COMPUTING DEVICE, AND READABLE STORAGE MEDIUM

CROSS-REFERENCE TO RELATED APPLICATION

The present application claims priority of Chinese patent application number 201910413128.3, titled "method of obtaining mask frame data, computing device, and readable storage medium," filed on May 17, 2019. The entire content of the above-identified application is incorporated in the present invention by reference.

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

DETAILED DESCRIPTION OF ILLUSTRATIVE EMBODIMENTS

Figures 1, 2:
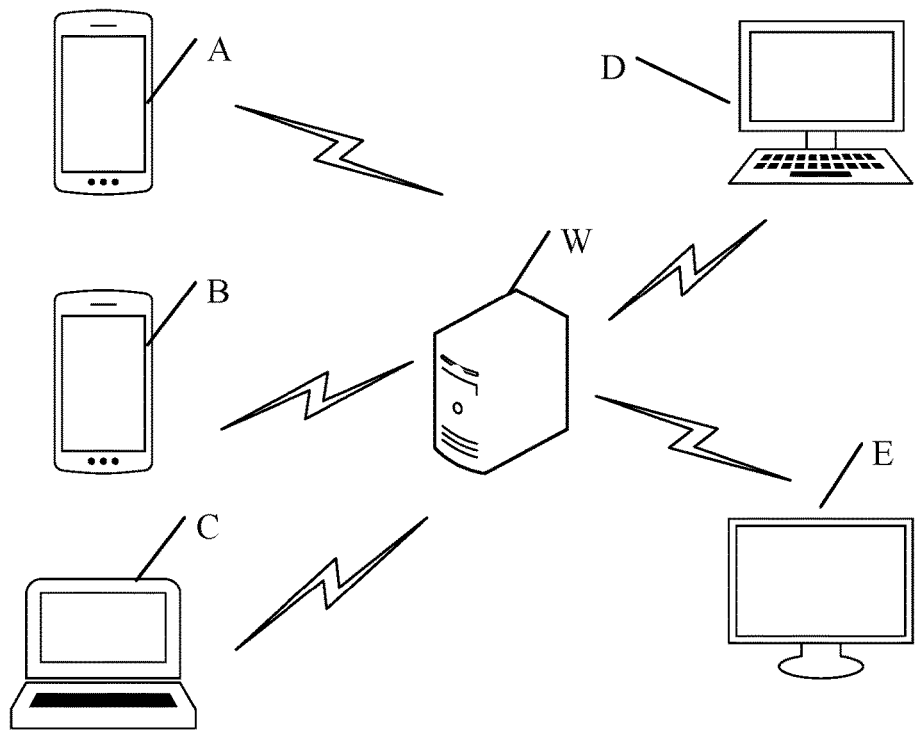
FIG. 1 illustrates a frame diagram of an embodiment of a system of obtaining mask frame data of the present invention.
FIG. 2 illustrates a flowchart of an embodiment of a method of obtaining mask frame data of the present invention.

The advantages of the present invention will be further described below with reference to the drawings and specific embodiments.

Exemplary embodiments will be described in detail here, examples of which are illustrated in accompanying drawings. When following descriptions refer to the accompanying drawings, same numerals in different drawings represent the same or similar elements unless otherwise indicated. The implementations described in the following exemplary embodiments do not represent all implementations consistent with the present disclosure. Rather, they are merely examples of devices and methods consistent with some aspects of the present disclosure, as detailed in appended claims.

The terminology used in this disclosure is only for purpose of describing particular embodiments and is not intended to limit the disclosure. As used in this disclosure and the appended claims, the singular forms "a," "an" and "the" are intended to include the plural forms as well, unless the context clearly indicates otherwise. It should also be understood that the term "and/or" as used herein refers to and includes any or all possible combinations of one or more of associated listed items.

It should be understood that, although terms first, second, third and so on may be used in this disclosure to describe various information, such information should not be limited to these terms. These terms are only used to distinguish the same type of information from each other. For example, without departing from scope of the present disclosure, the first information may also be referred to as the second information, and similarly, the second information may also be referred to as the first information. Depending on context, the word "if" as used herein can be interpreted as "at" or "when" or "in response to determination".

In the description of the present invention, it should be understood that numerical labels before steps do not indicate order of the steps before and after execution, and are only used to facilitate the description of the present invention and distinguish each step, so it cannot be understood as a limitation on the present invention.

The video in the embodiment of the present application can be presented in large video playing devices, game consoles, desktop computers, smartphones, tablets, MP3 (Moving Picture Experts Group Audio Layer III, moving picture expert compression standard audio layer) players, MP4 (Moving Picture Experts Group Audio Layer IV, moving picture expert Compression standard audio level) players, laptops, e-book readers, and other display terminals.

The video in the embodiment of the present application can be applied not only to a video program in type of a game but also to any application scenario in which bullet screens can be displayed. For example, the video can be applied to some job-seeking programs, to some blind-dating programs, to multi-party confrontation entertainment programs, and so on. In the embodiment of the present application, the video is applied to a football live video broadcast program as an example, but not limited thereto.

A commentary service is provided that allows users to comment and/or share comments associated with a video or other content. The commentary service has transformed the viewing experience by displaying comments reflecting thoughts and feelings of users viewing the same video. This commentary service fosters a highly interactive and enjoyable viewing experience and allows a user to benefit from the strong emotional bonds with other users who share similar aspiration and interests. The comments on any content may be animated when displayed. For example, the comments may be shown scrolling (e.g., from right to left, left to right, top to bottom, bottom to top) across the content, which may be referred to as "bullet screens."

A bullet screen refers to a comment floating across the screen in an effect of looking like a barrage in a flying shooting game, hence named as bullet screen. During watching a live broadcast or a video, a user can increase interaction between users or between users and network anchors by a way of sharing bullet screens. Bullet screens are displayed on a screen in a scrolling manner so that they can be viewed by other users, which forms a new network social form based on video viewing and surrounding video content.

However, video content may be heavily blocked when excessive bullet screens are presented, which may affect visual experience. In order not to affect viewing of live broadcast, most users usually choose to shield all bullet screens on the live broadcast screen. However, the user chooses to shield all bullet screens, which makes bullet screens for interaction not be able to be displayed on the screen, reducing the interaction in a live broadcast room.

In the embodiment of the present application, after a video data uploaded from a user client and a corresponding bullet screen data are processed by a server W, a mask frame data segment is generated and can be sent to each watching side (that is, pulling stream side) via the server W, and each watching side then plays the video data, the mask frame data segment, and bullet screen information. Referring to FIG. 1, FIG. 1 is a system architecture diagram of a method of displaying bullet screen information according to an embodiment of the present application. As shown in FIG. 1, user A, user B, and user C watch, through a wireless network, video data of which bullet screens after being processed by a server W are not to be displayed in a main area of a video, and both user D and user E watch, through a wired network, video data of which bullet screens after being processed by the server W are not to be displayed a main area of a video. Herein provides one server W. The application scenario herein may also include multiple servers communicating with each other. The server W may be a cloud server or a local server. In the embodiment of the present application, the server W is placed on a cloud side. Supposing the server W processes a certain recorded live video data and bullet screen information, and forwards the processed video data to the user A, the user B, the user C, the user D, and the user E.

The present invention provides a method of obtaining mask frame data to solve a defect existing in the prior art that excessive bullet screen affects watching effect. Referring to FIG. 2, which is a flowchart of a method of obtaining mask frame data in accordance with a preferred embodiment of the present invention. As can be seen from the figure, the method of obtaining mask frame data provided in the embodiment mainly includes the following steps:

A1. identifying a main area of at least one frame image in a video by an image segmentation algorithm.

As an embodiment, the main area of at least one frame image in the video may be identified by a semantic segmentation model.

The semantic segmentation model includes in turn at least two feature extraction modules, at least one feature enhancement layer, and a classification layer.

Figure 3:
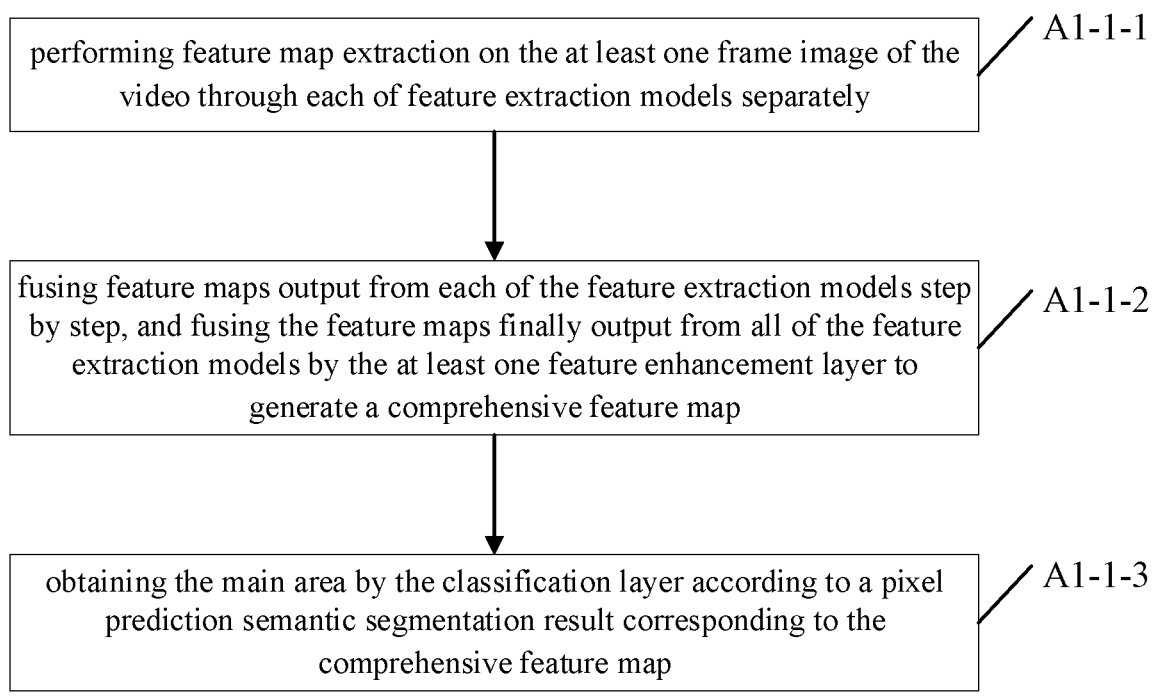
FIG. 3 illustrates a flowchart of an embodiment of the identifying a main area of a frame image in a video by a semantic segmentation model of the present invention.

Referring to FIG. 3, the step of identifying a main area of at least one frame image in a video by a semantic segmentation model includes:

A1-1-1. performing feature map extraction on the at least one frame image of the video through each of feature extraction models separately;

A1-1-2. fusing feature maps output from each of the feature extraction models step by step, and fusing the feature maps finally output from all of the feature extraction models by the at least one feature enhancement layer to generate a comprehensive feature map;

A1-1-3. obtaining the main area by the classification layer according to a pixel prediction semantic segmentation result corresponding to the comprehensive feature map.

The semantic segmentation model may be FCN, DilatedNet, deeplab and other models.

As an example but not a limitation, the semantic segmentation model is a deeplab model. The deeplab model has advantages of good effect and fast speed. The Deeplab model mainly includes a network backbone for extracting the feature maps, a feature enhancement layer for enhancing features to reduce impact of size of the feature maps, and a classification layer for predicting a category corresponding to each pixel (category 0 is usually a background), and categories that more commonly used are 91 categories of the coco dataset, including characters, some animals, some common objects, and so on).

Further, before implementing the step A1-1-3 obtaining the main area by the classification layer according to a pixel prediction semantic segmentation result corresponding to the comprehensive feature map, further includes:

constraining pixels of each object area in the comprehensive feature map by a Conditional Random Field model, to obtain a processed comprehensive feature map.

In the step, considering rough boundary of the extracted object area, in order to improve the continuity and fit of the boundary, a post-processing method of boundary detection is used. The Conditional Random Field module is used to smooth a current image according to a previous frame image (or one of the previous frames) to improve the continuity of the boundary of the object area of each frame and improve the visual fit.

Figure 4:
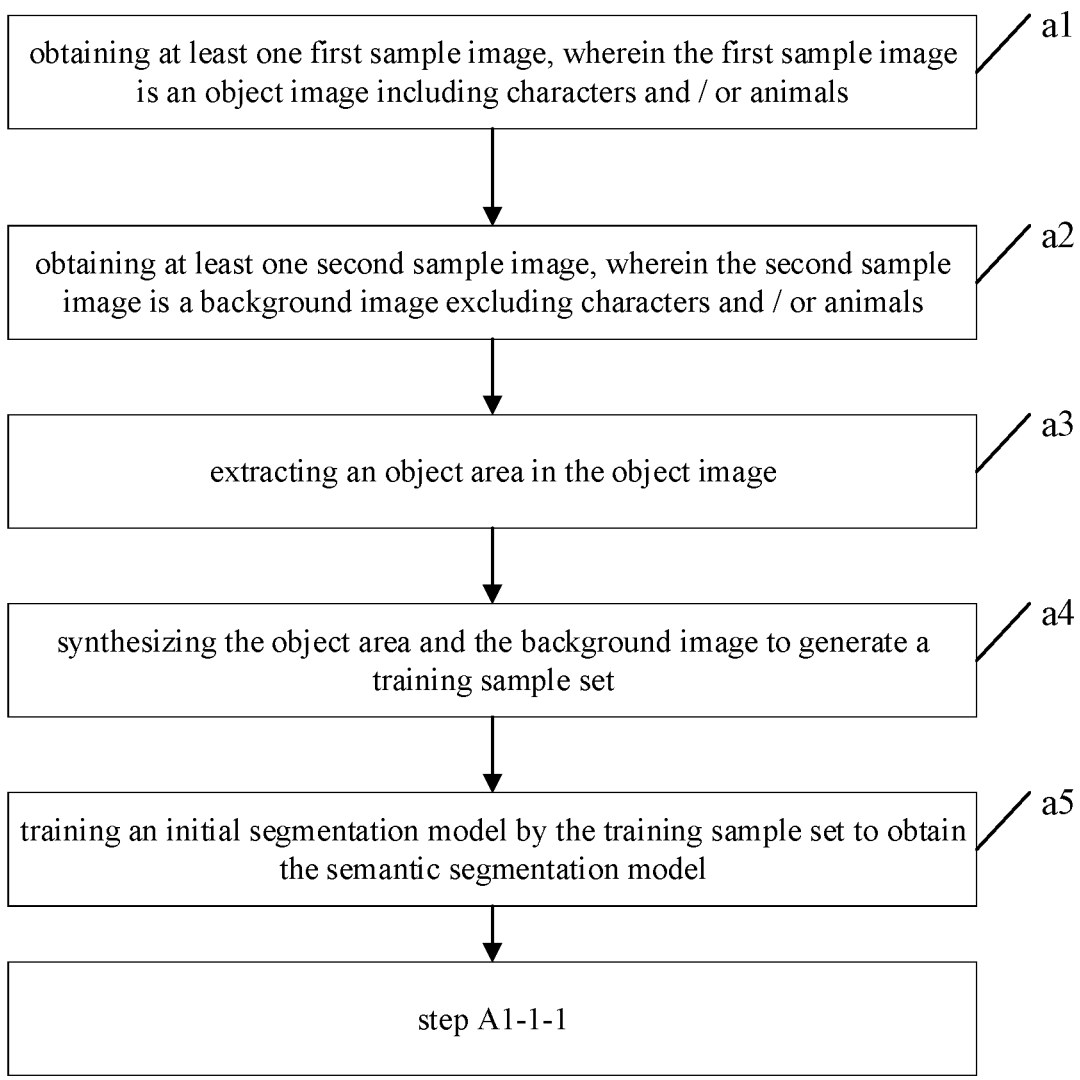
FIG. 4 illustrates a flowchart of another embodiment of the identifying a main area of a frame image in a video by a semantic segmentation model of the present invention.

Refer to FIG. 4, before implementing the step of identifying the main area of at least one frame image in the video by a semantic segmentation mode, further includes:

a1. obtaining at least one first sample image, wherein the first sample image is an object image including characters and/or animals;

a2. obtaining at least one second sample image, wherein the second sample image is a background image excluding characters and/or animals;

a3. extracting an object area in the object image;

a4. synthesizing the object area and the background image to generate a training sample set;

a5. training an initial segmentation model by the training sample set to obtain the semantic segmentation model, and implementing the step A1-1-1.

In practical applications, considering that the training samples of animation are not easy to collect, before identifying the main area of animation video using the semantic segmentation model, it is necessary to train the semantic segmentation model and provide a training sample set that conforms to the animation. Therefore, the training sample set with animation image and background can be synthesized through steps A1-A5. First, obtaining a batch of images of animated characters (such as two-dimension animated characters) with a transparent background or a single color background (simple background), and obtaining a part of images of the animated characters by a way of image matting (such as a clustering algorithm); then obtaining a batch of animation background images without animated characters. The images of animated characters and the background images are superposed and synthesized respectively by adjusting the scale and color to obtain the training sample set, and the training sample set is configured to train the initial segmentation model to obtain the semantic segmentation model.

Further, the step a5 training an initial segmentation model by the training sample set to obtain the semantic segmentation model, may include:

obtaining a corresponding object region recognition result by inputting the training sample set into an initial segmentation model, and updating parameter values of the initial segmentation model;

obtaining the semantic segmentation model until the training of the initial segmentation model is completed.

As another embodiment, the main area of the at least one frame image further can be identified by an instance segmentation model.

Wherein, the instance segmentation model includes an extraction module, a classification module, a regression module, and a mask module;

the extraction module includes a feature extraction module and a region extraction module.

Figure 5:
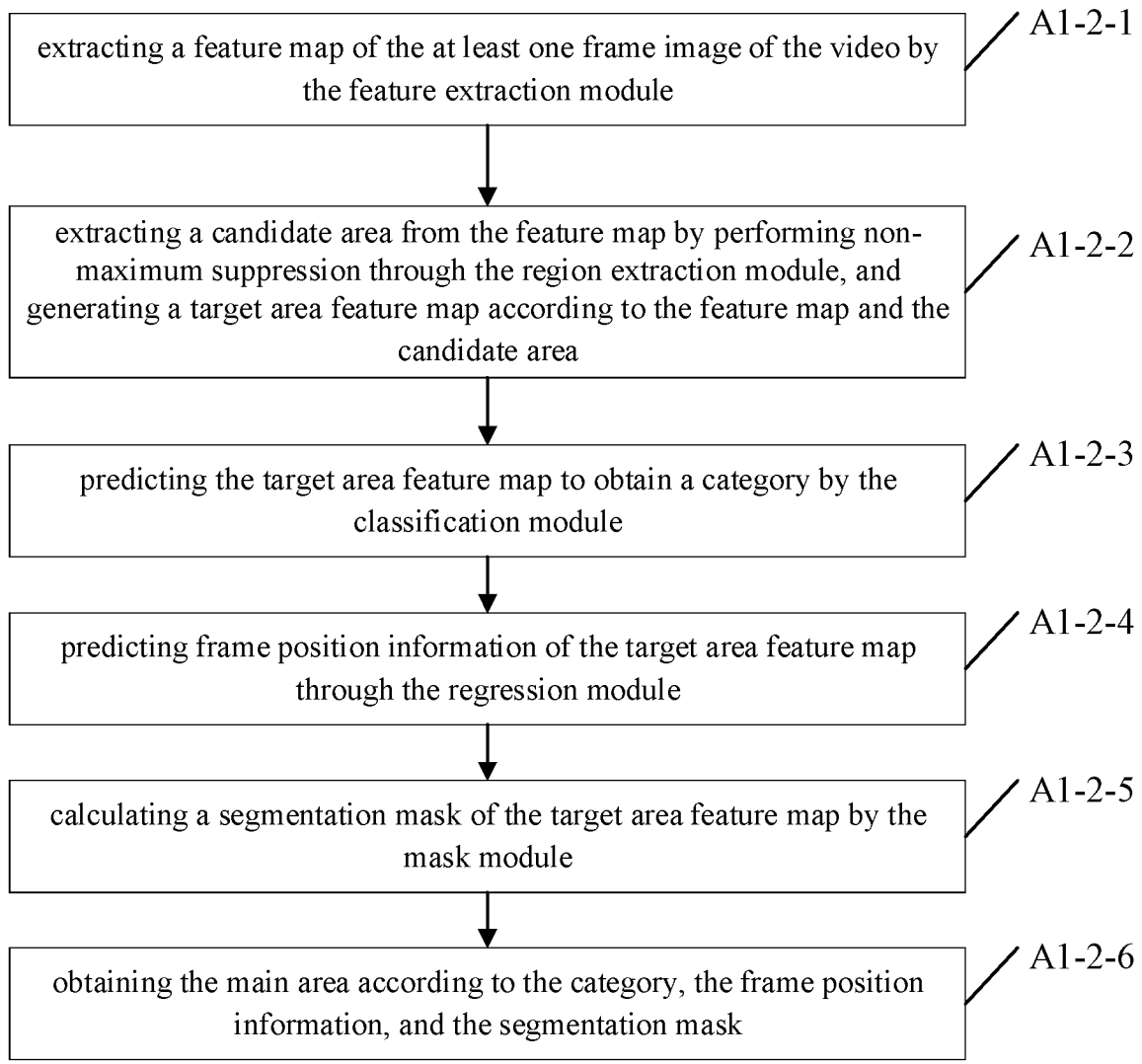
FIG. 5 illustrates a flowchart of an embodiment of the identifying a main area of a frame image by an instance segmentation model of the present invention.

Refer to FIG. 5, the step of identifying the main area of the at least one frame image by an instance segmentation model may include:

A1-2-1. extracting a feature map of the at least one frame image of the video by the feature extraction module;

A1-2-2. extracting a candidate area from the feature map by performing non-maximum suppression through the region extraction module, and generating a target area feature map according to the feature map and the candidate area;

A1-2-3. predicting the target area feature map to obtain a category by the classification module;

A1-2-4. predicting frame position information of the target area feature map through the regression module;

A1-2-5. calculating a segmentation mask of the target area feature map by the mask module;

A1-2-6. obtaining the main area according to the category, the frame position information and the segmentation mask.

As an example but not a limitation, the instance segmentation model may use a maskrcnn model. Considering that the control of the semantic segmentation model is very weak when it is subsequently added to post-processing, there is no way to achieve instance-level control. Therefore, the instance segmentation model is used to improve stability (more applicable). The maskrcnn model mainly includes a network backbone for extracting feature maps, an area extraction module for extracting feature areas (ROI+RPN+ align), a classification module for classification, a regression module, and a mask module.

In practical application, because of the low efficiency of the instance segmentation model in model training and mask generating, an iterative model prefers the semantic segmentation model. For a large task with long video time and a video with a simple scene, the semantic segmentation model is preferred, which is fast. For a video with a complex scene, the instance segmentation model can be used with a good recognition effect.

A2. generating mask frame data according to the main area.

The step A2 generating mask frame data according to the main area, includes:

generating the mask frame data according to a width of the main area, a height of the main area and a corresponding time stamp of the frame image in the video.

In the embodiment, the main area of the frame image in the video is identified by the image segmentation algorithm, and then mask frame data is generated according to the main area. When playing the video, bullet screen information can be displayed in an area other than an area corresponding to the mask frame data, so as to avoid the main area in the video being covered during playing to improve the user's viewing effect.

The above method of obtaining mask frame data can be applied to a method of displaying bullet screen information. The procedure of the method of displaying bullet screen information will be described in detail with reference to the flowcharts of FIGS. 6 to 7. The processing corresponding to these flowcharts can be realized by the processor reading the corresponding processing program stored in the storage medium, for example, loading the programs into the memory and implementing them.

Figure 6:
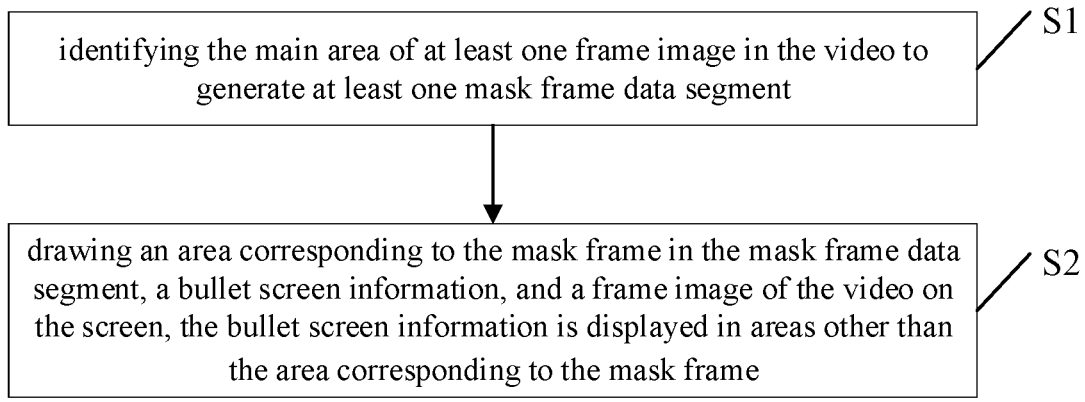
FIG. 6 illustrates a flowchart of an embodiment of a method of displaying bullet screen information of the present invention.
Figure 7:
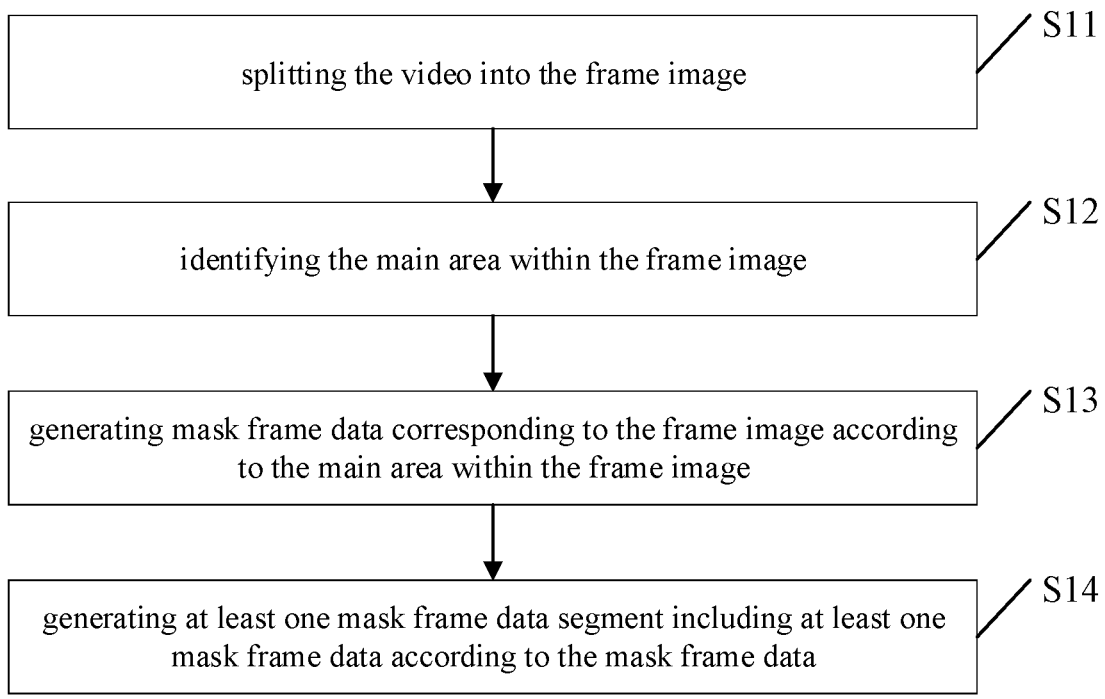
FIG. 7 illustrates a flowchart of an embodiment of the identifying a main area of a frame image to obtain mask frame data segment of the present invention.

As shown in FIG. 6, the method of displaying bullet screen information includes the following steps:

S1, identifying the main area of at least one frame image in the video to generate at least one mask frame data segment;

wherein, each of the mask frame data segment corresponds to a location frame list that locating a physical position of the mask frame data segment.

The location frame list stores a physical address of each of the mask frame data segment, and each of the mask frame data segments associated with the video can be queried via the position frame list.

It should be noted: the main area may be selected from at least one of the following:

a character area range, an animal area range, a landscape area range, an architectural area range, an artwork area range, a text area range, and a background area range different from characters, animals, buildings, and arts.

The step S1 of identifying a main area of a frame image in a video to generate a mask frame data segment may include (referring to FIG. 7):

S11, splitting the video into the frame image;

S12, identifying the main area within the frame image; and

S13, generating mask frame data corresponding to the frame image according to the main area within the frame image.

In the step, the mask frame data corresponding to the frame image is generated according to the main area corresponding to the main area within the frame image, a size of the main area, and a video timestamp corresponding to the frame image.

Following, with regard to a process of obtaining the mask frame data in the embodiment, the process of obtaining the mask frame data will be described in detail with reference to the flowcharts of FIG. 8. The processing corresponding to these flowcharts can be realized by a processor reading corresponding processing programs stored in a storage medium, for example, the programs are loaded into a memory and executed.

Figure 8:
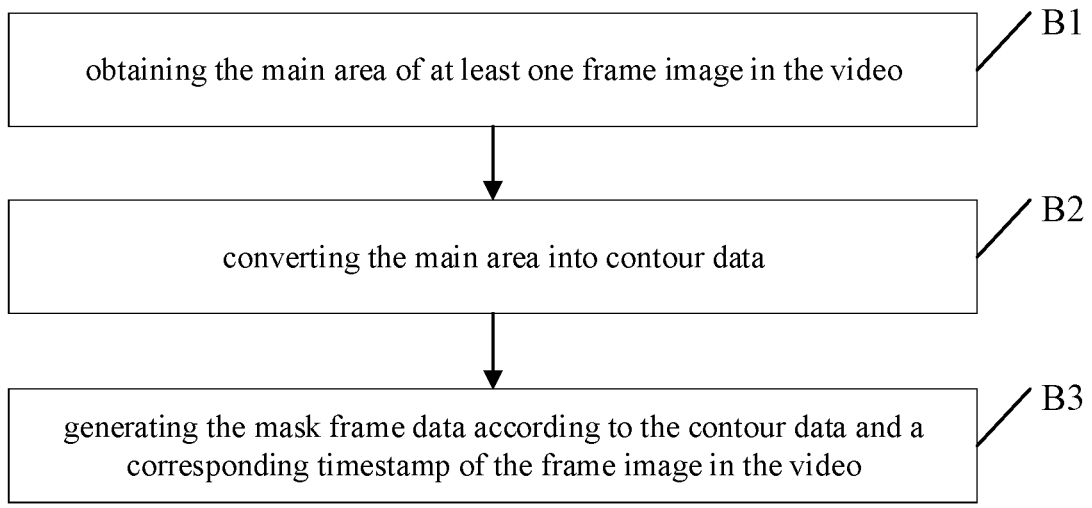
FIG. 8 illustrates a flowchart of another embodiment of a method of obtaining mask frame data of the present invention.

As shown in FIG. 8, the method of obtaining the mask frame data includes the following steps:

B1. obtaining the main area of at least one frame image in the video;

It should be noted: the main area may be selected from at least one of the following:

the character area range, the animal area range, the landscape area range, the architectural area range, the artwork area range, the text area range, and a background area range different from characters, animals, buildings, and arts.

B2. converting the main area into contour data;

In the step B2, the step of converting the main area into contour data includes:

representing each pixel in the main area respectively by color values;

forming the contour data by the color values corresponding to all pixels in the main area.

In the embodiment, each pixel in the main area is marked (marked as a character or non-character), for example: a character part can be marked as black, and a non-character part is marked as white, the mask frame data finally obtained is a picture like a shadow (that is, a Bitmap (bitmap file) format).

After implementing the step of converting the main area to contour data in step B2, at least one step of b21, b22, b23, and b24 may also be included, as follows:

b21. compressing a pixel resolution of the contour data, and adjusting the pixel resolution of the contour data to a preset pixel resolution range.

For a video image of one frame with 1080×720, 777660 pixels are required to describe the Bitmap completely. Therefore, in order to reduce volume of the Bitmap, the volume of Bitmap can be reduced by reducing image size. Considering that the mask frame data actually does not need to have a resolution as high as an original video's, even if the resolution of the mask frame data itself is much lower than the video's, a final effect will not be significantly reduced, therefore size of the contour data Bitmap is limited to a preset size, such as: 320×180, thereby achieve a purpose of reducing the volume of the Bitmap.

b22. compressing a color bit depth of the contour data, and adjusting the color bit depth of the contour data to a preset binary bit.

Usually, each pixel of Bitmap needs RGBA8888, that is, red, green, blue, and transparency, four attributes, and each attributes express color of a pixel by 8 bits, but for the mask frame data, it can be achieved that whether the pixel is the character is indicated using the binary bit, therefore the bitmap volume can be reduced by reducing a storage space occupied by each pixel.

b23. compressing the contour data.

As an example and not a limitation, a gzip algorithm can be used to compress the contour data in the step. The contour data Bitmap has a very distinctive feature. The character part and the non-character part both appear in consecutive large blocks, therefore a data repetition rate is extremely high, therefore, a compression rate is effectively improved using the gzip algorithm.

b24. performing an edge feathering processing on the contour data.

Considering that the mask frame data actually does not need to have the resolution as high as the original video's, an edge of the contour data can be feathered using a method of diming edges, to improve smoothness of the contour data, thereby improving a visual effect.

In step B2, the step of converting the main area into contour data may include:

converting the main area into the contour data in Scalable Vector Graphics (SVG) format.

SVG is a graphic format that describes two-dimensional vector graphics based on Extensible Markup Language (which is a subset of standard generalized markup language). SVG outlines edges of the character using a curve equation.

B3. generating the mask frame data according to the contour data and a corresponding timestamp of the frame image in the video.

It should be noted that when a client is a mobile terminal, data in Bitmap format can be used directly; when the client is displayed through a browser (which is limited to a browser CSS standard), only data in SVG format can be accepted, so in the browser, data in SVG format is required, but finally all data in Bitmap format is needed (other vector formats, such as SVG will eventually be converted into Bitmap, and then output to a computer).

S14. generating at least one mask frame data segment including at least one mask frame data according to the mask frame data.

In a server, the mask frame data is generated by identifying the main area of each frame image in the video, and then the mask frame data segment is formed by the mask frame data, and finally a mask file corresponding to the video is obtained. The mask file includes the mask frame data segment.

Figure 9:
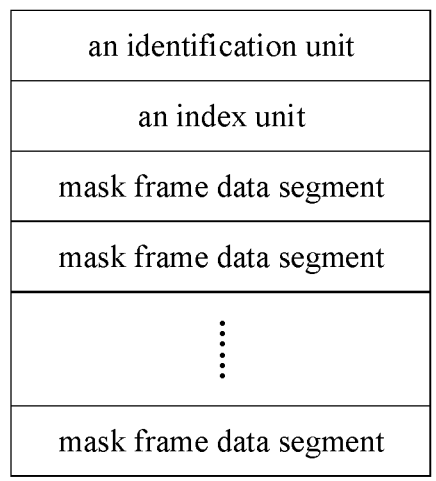
FIG. 9 illustrates a structural diagram of an embodiment of a mask file structure of the present invention.

The technical scheme can be applied to an offline on-demand video scene. In a server, the main area of each frame image in the video is identified, and a mask file structure including the mask frame data segment is generated. The mask file structure (as shown in FIG. 9) may include at least one mask frame data segment, an identification unit and an index unit (i.e. position frame list); wherein, The mask frame data segment is configured to record the mask frame data of at least one frame;

wherein, the mask frame data segment is composed of at least one mask frame data arranged according to a preset time length and a time sequence of a mask frame timestamp.

The mask frame data may include a width, a height, a timestamp (i.e., timestamp of the frame image of a original video), and frame data of the mask frame.

Each mask frame data segment contains several consecutive mask frame data. These mask frames are closely arranged according to their pts_time_ms from large to small. Whether they are compressed depends on an encoding format (i.e. codec_id value) in the identification unit. For example:

--- mask frames sorted by pts_time_ms, optionally compressed
mask frames sorted by pts_time_ms, optionally compressed
... ...

---

|mask frames sorted by pts_time_ms, optionally compressed|

When using codec_id=0x0 (bitstream, gzip compressed) mask encoding, a series of mask frames are arranged closely according to their pts_time_ms from small to large, and then compressed into a mask frame data segment by a gzip compression algorithm. The mask frame data consists of: a frame width+a frame height+frame PTS+frame data. The format of the mask frame data is as follows:

---

| 2 bytes | 2 bytes | 8 bytes | (width * height)/8 bytes |
| width | height | pts_time_ms | data |

---

Wherein, width represents the width of the frame, occupying 2 bytes, network sequence, unsigned integer; height represents the height of the frame, occupying 2 bytes, network sequence, unsigned integer; pts_time_ms represents the PTS time of the frame, occupying 8 bytes, network sequence, unsigned integer, unit: ms; data represents the binary data of the frame, occupying (width*height)/8 bytes, each bit represents a pixel, and the width is stored first.

When using codec_id=0x1 (svg) mask encoding, a series of mask frame data are arranged closely according to their pts_time_ms from small to large, without compression. The mask frame data consists of: the frame data length+the frame PTS+the frame data, the format of the mask frame data is as follows:

| 4 bytes | 8 bytes | data_size bytes |
|---|---|---|
| data_size | pts_time_ms | data |

Wherein, data_size represents the length of the frame data, occupying 4 bytes, network sequence, unsigned integer, the frame data length does not include data_size field and pts_time_ms field itself, pts_time_ms represents the PTS time of the frame data (the mask frame is taken from which original image frame, that is, a timestamp corresponding to the frame image of the original video), occupying 8 bytes, network sequence, unsigned integer, unit: ms; data represents the binary data of the frame, occupying data_size bytes, svg format.

When using codec_id=0x2 (svg, gzip compressed) mask coding, a series of mask frame data are closely arranged according to its pts_time_ms from small to large, and then compressed by the gzip compression algorithm. The mask frame data consists of frame data length+frame PTS+frame data. The format of mask frame data is as follows:

| 4 bytes | 8 bytes | data_size bytes |
|---|---|---|
| data_size | pts_time_ms | data |

Wherein, data_size represents the length of the frame data, occupying 4 bytes, network sequence, and the frame data length does not include data_size field and pts_time_ms field itself, pts_time_ms represents the pts time of a frame (the mask frame is taken from which original image frame, that is, a timestamp corresponding to the frame image of the original video), occupying 8 bytes, network sequence, unit: ms; data represents the binary data of frame, occupying data_size bytes, svg format.

The identification unit is set at a first preset position in the mask file, for recording a file identification, an encoding format of the mask frame data segment, and a size parameter of the index unit;

the identification unit is also used for recording a version number of the mask file.

The identification unit is fixed at 16 bytes and is located in the first 16 bytes of the mask file. The specific structure is as follows:

| 4 bytes | 4 bytes | 1 byte | 3 bytes | 4 bytes |
|---|---|---|---|---|
| file tag | version | codec_id | reserved | entry_num |

Wherein, file tag represents the file identification, the fixed value is "MASK", occupying 4 bytes, and can be regarded as magic number; version represents a version number of the mask file, occupying 4 bytes, network sequence, unsigned integer, a legal value may be 1, and it needs to be regarded as an invalid file in case of a higher version; reserved represents reserved fields, occupying 3 bytes, and the filling may be 0; entry_num represents a number of index entries in the index unit, occupying 4 bytes, network sequence, unsigned integer, and a length of frame index table item is fixed to 16 bytes; codec_id represents coding mode, occupying 1 byte, unsigned integer, describing the coding format of the mask frame and the mask frame data segment, and a legal value may be in the following forms:

|codec_id| - - - mask frame encoding method, mask frame data segment format.

|0x0|bitstream| - - - a series of mask frames are closely arranged from small to large according to pts_time_ms (indicating the mask frame is taken from which original image frame, that is, the timestamp corresponding to the frame image of the original video), and then compressed using the gzip compression.

|0x1|svg| - - - a series of mask frames are arranged closely according to pts_time_ms from small to large, without compression.

|0x2|svg| - - - a series of mask frames are arranged closely according to pts_time_ms from small to large, and then compressed using the gzip compression.

The index unit is set at a second preset position in the mask file and is configured to record and indicate a physical position of each mask frame data segment and a length parameter of the mask frame data segment in the mask file. The length parameter is a length from a start mask frame of the mask frame data segment to an end mask frame of the mask frame data segment. The physical position is a timestamp of the start mask frame of the mask frame data segment.

Wherein, the first preset position is head of the mask file; the second preset position is located behind the first preset position.

The index unit is composed of several entries with the same length. The length of each entry is fixed to 16 bytes. For example:

| 8 bytes | 8 bytes |
|---|---|
| pts_time_ms | file_offset |
| pts_time_ms | file_offset |
| ... ... | ... ... |
| pts_time_ms | file_offset |

The index unit is composed of pts_time_ms and file_offset.

pts_time_ms: 8 bytes, network sequence, unsigned integer, representing pts_time of the start mask frame contained in the mask frame data segment, unit: ms;

file_offset: 8 bytes, network sequence, unsigned integer, representing an offset of the mask frame data segment in the mask file.

It should be noted that the entries in the index unit are stored in order in accordance with the size of pts_time_ms size, which is helpful for quickly retrieving the mask frame data segment of a frame whose pts_time_ms is known. Moreover, if an entry B is in front of A, the length of the frame data segment pointed to by A is B.file_offset-A.file_offset. For the last entry, it is the length from its file_offset to the end of the file.

In practical applications, a client requests the index unit through HTTPS (HyperText Transfer Protocol) to obtain the identification unit and the index unit. According to a current video viewing progress, an offset of a corresponding mask frame data in the mask file can be found in the index unit (that is, a position of the mask frame data segment where the mask frame data is located in the mask file). The mask frame data segment corresponding to the playback progress time is downloaded through an HTTP request, to ensure that the client can quickly locate the mask frame data corresponding to the playback time when the client user drags a video progress bar, which improves the user's viewing effect.

In general, the identification unit describes brief information of the entire file, and the index unit table is configured to quickly index the mask frame data segment according to pts_time (ie: the timestamp corresponding to the frame image of the original video). The mask frame data segment contains mask frame data within a certain time period.

The format of the mask file is: an identification unit+an index unit+several mask frame data segments. These three parts of data are stored in the mask file immediately, for example:

| | |
|---|---|
| mask file header | ---representing the identification unit. |
| mask frame indexing table | --- representing the index unit. |
| mask frames data segment | --- representing the mask frame data segment. |
| mask frames data segment | --- representing the mask frame data segment. |
| ... ... | |
| mask frames data segment | --- representing the mask frame data segment. |

Figure 10:
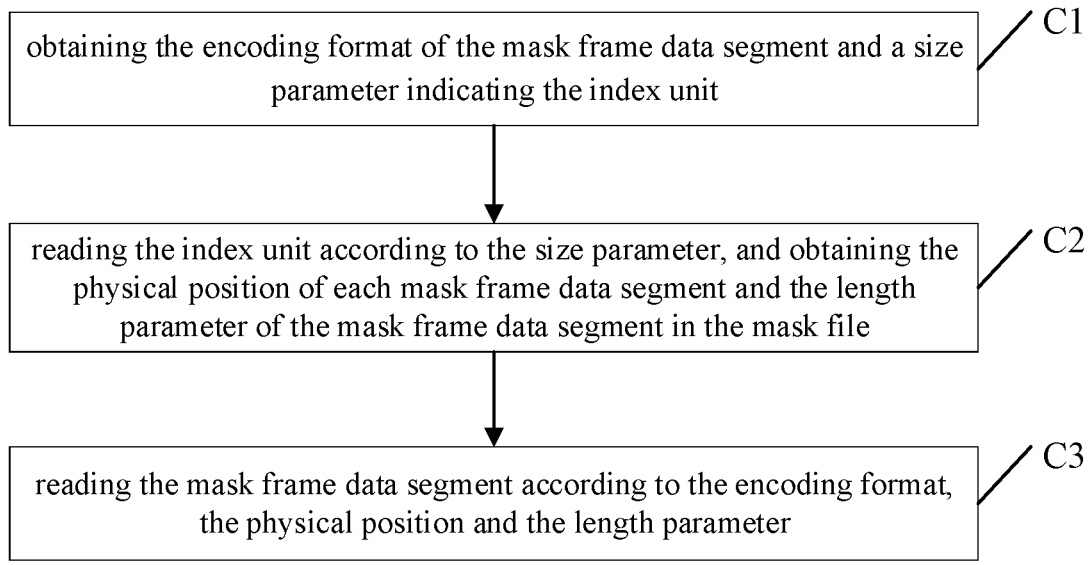
FIG. 10 illustrates a flowchart of an embodiment of a method of reading a mask file of the present invention.

For the above mask file, a method of reading the mask file can include the following steps (refer to FIG. 10):

C1. obtaining the encoding format of the mask frame data segment and a size parameter indicating the index unit; Specifically, the step C1 obtaining the encoding format of the mask frame data segment and the size parameter indicating the index unit includes:

obtaining the encoding format of the mask frame data segment and size parameter indicating the index unit in the identification unit of the mask file.

C2. reading the index unit according to the size parameter, and obtaining the physical position of each mask frame data segment and the length parameter of the mask frame data segment in the mask file;

C3. reading the mask frame data segment according to the encoding format, the physical position, and the length parameter.

Specifically, the step C3 reading the mask frame data segment according to the encoding format, the physical position, and the length parameter, including:

calculating a timestamp of the start mask frame of the mask frame data segment corresponding to the current playing time in the index unit according to the encoding format and the length parameter based on the current playing timestamp; and obtaining a corresponding physical position of the mask frame data segment according to the timestamp of the start mask frame.

S2. drawing an area corresponding to the mask frame in the mask frame data segment, a bullet screen information, and a frame image of the video on the screen, the bullet screen information is displayed in areas other than the area corresponding to the mask frame.

In practical applications, when the main area is in the character area range, the bullet screen information is not displayed in the character area range, but displayed in areas outside the character area range; when the main area is in the text area range, the bullet screen information is not displayed in the text area range, but displayed in areas outside the text area range; and when the main area is the background area range different from characters, animals, buildings, and arts, the bullet screen information is not displayed in the background area range, but displayed in areas outside the background area range.

Figure 11:
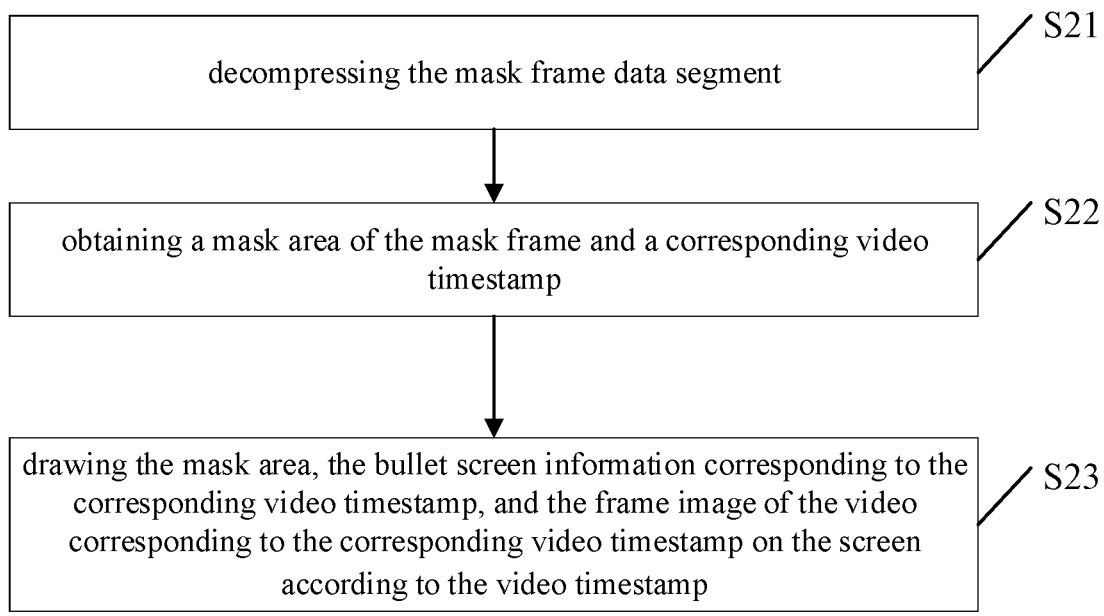
FIG. 11 illustrates a flowchart of an embodiment of drawing an area corresponding to a mask frame in a mask frame data segment, bullet screen information, and frame image of a video onto a screen of the present invention.

The step of drawing an area corresponding to the mask frame in the mask frame data segment, a bullet screen information, and a frame image of the video on the screen in step S2 (as shown in FIG. 11) includes:

S21. decompressing the mask frame data segment;

S22. obtaining a mask area of the mask frame and a corresponding video timestamp;

S23. drawing the mask area, the bullet screen information corresponding to the corresponding video timestamp, and the frame image of the video corresponding to the corresponding video timestamp on the screen according to the video timestamp. Thus, a temporal consistency of the mask area, the bullet screen information, and the frame image of the video is guaranteed.

Before implementing S23 of drawing the mask area, and the bullet screen information corresponding to the corresponding video timestamp and the frame image of the video corresponding to the corresponding video timestamp on the screen, further including:

performing edge feathering processing on the mask area of the mask frame, to improve the smoothness of edge of the mask frame, thereby improving the visual effect.

In the embodiment, the mask frame data segment is generated by identifying the main area of at least one frame image in the video; then when playing the video, the area corresponding to the mask frame in the mask frame data segment, the bullet screen information, and the frame image of the video are drawn on the screen, so that the bullet screen information is displayed in areas other than the area corresponding to the mask frame, so as to achieve the purpose of avoiding the main area of the video being covered during playing, thereby improving the user's watching effect.

Following, for the process of displaying the bullet screen information on the screen in the embodiment, the process of a method of rendering a bullet screen mask will be described in detail with reference to the flowchart in FIG. 12. The processing corresponding to these flowcharts can be realized by the processor reading the corresponding processing programs stored in the storage medium, for example, the programs are loaded into the memory and executed.

Figure 12:
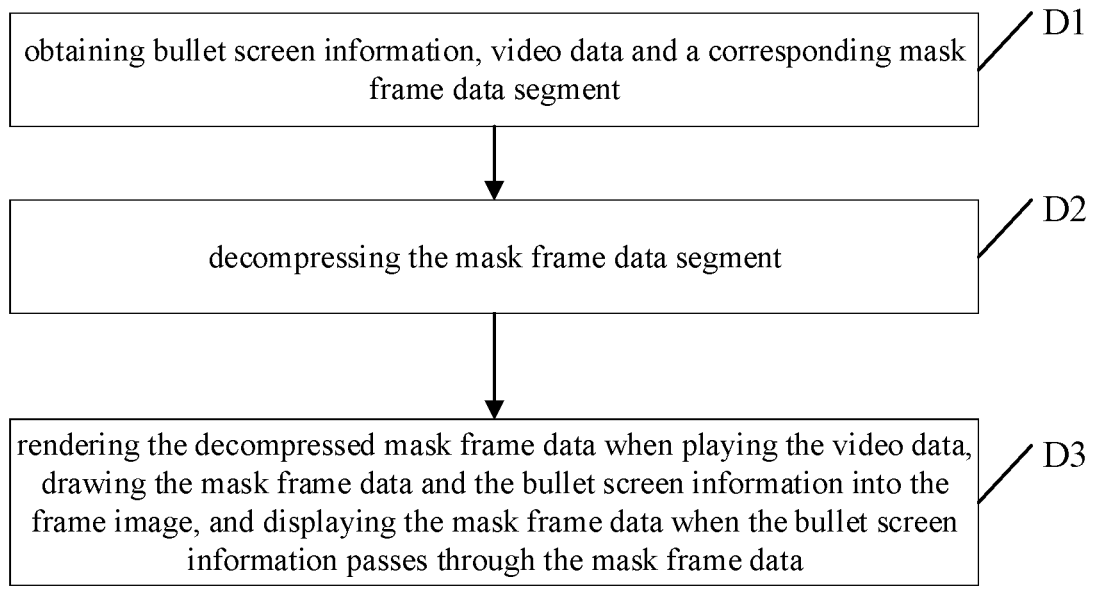
FIG. 12 illustrates a flowchart of an embodiment of a method of rendering bullet screen mask of the present invention.

As shown in FIG. 12, the method of rendering the bullet screen mask may include following steps:

D1. obtaining bullet screen information, video data, and a corresponding mask frame data segment;

D2. decompressing the mask frame data segment;

The step of decompressing the mask frame data segment in step D2 includes:

enlarging a display ratio of each of the decompressed mask frame data according to a preset decompression proportion, thereby the mask area corresponding to the mask frame data and the main area of an original video image are consistent in size, and the user's viewing effect is ensured.

Specifically, the display ratio of the mask frame data may be enlarged by a way of bilinear stretching.

Before implementing step D2 of decompressing the mask frame data segment, further including:

converting the mask frame data segment into the mask frame data segment in a raster format (which is a bitmap file format). Because the bullet screen mask is required to process the data in the bitmap file format, therefore data format needs to be uniformly converted into the bitmap file format before being processed.

D3. rendering the decompressed mask frame data when playing the video data, drawing the mask frame data and the bullet screen information into the frame image, and displaying the mask frame data when the bullet screen information passes through the mask frame data.

When implementing step D3, the step of rendering the decompressed mask frame data when playing the video data, drawing the mask frame data and the bullet screen information into the frame image may include:

performing the edge feathering processing on the mask frame data, the processed mask frame data and drawing the bullet screen information are drawn into the frame image according to the video timestamp when playing the video data. Thus, the temporal consistency of the mask area, the bullet screen information, and the frame image of the video is guaranteed. The edge feathering processing on the mask frame data is performed, thereby making the edges of the mask frame data softer and more natural.

When implementing step D3, the step of displaying the mask frame data when the bullet screen information passes through the mask frame data includes:

The mask frame data is a transparent channel, and when the bullet screen information passes through the mask frame data, the bullet screen information and the transparency of the mask frame data are multiplied and drawn into the frame image.

When displaying the bullet screen information, the bullet screen can gradually change from being completely opaque to being completely transparent at the edge of the mask frame data, making the mask softer and more natural, meanwhile effectively avoiding a problem that algorithms do not accurately identify a main edge of frames.

Figure 13:
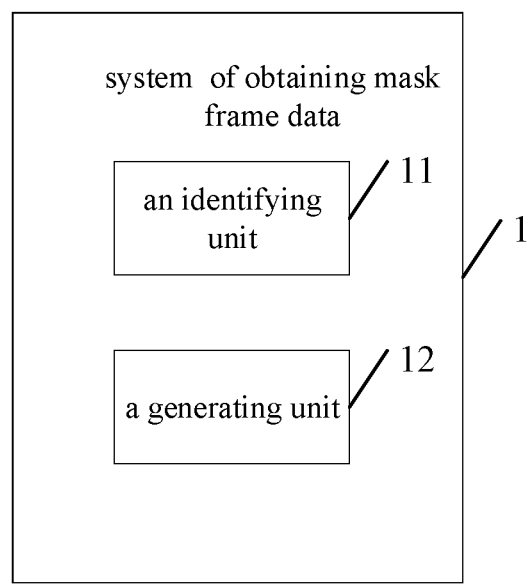
FIG. 13 illustrates a block diagram of an embodiment of a system of obtaining mask frame data of the present invention.

As shown in FIG. 13, a system 1 for obtaining mask frame data, includes: an identifying unit 11 and a generating unit 12, wherein:

the identifying unit 11, identifying a main area of the at least one frame image in the video by a semantic segmentation model;

the generating unit 12, generating mask frame data according to the main area.

In a preferred embodiment, the identifying unit 11, further identifying the main area of the at least one frame image in the video by a semantic segmentation model.

Wherein, the semantic segmentation model successively includes at least two feature extraction models, at least one feature enhancement layer, and a classification layer.

In a preferred embodiment, in the system 1 of obtaining mask frame data, the step of identifying a main area of the at least one frame image in the video by the identifying unit 11 using the semantic segmentation model includes:

extracting feature maps of the at least one frame image of the video through each feature extraction model separately;

fusing the feature maps output from each of the feature extraction models step by step, and fusing the feature maps finally output from all of the feature extraction models by the at least one feature enhancement layer to generate a comprehensive feature map;

obtaining the main area by the classification layer according to a pixel prediction semantic segmentation result corresponding to the comprehensive feature map.

In a preferred embodiment, in the system 1 for obtaining mask frame data, before the step of identifying a main area of the at least one frame image in the video by the identifying unit 11 using the semantic segmentation model, includes:

obtaining at least one first sample image, wherein the first sample image is an object image including characters and/or animals;

obtaining at least one second sample image, wherein the second sample image is a background image excluding characters and/or animals;

extracting an object area in the object image (traditional cutout system, clustering method);

synthesizing the object area and the background image to generate a training sample set;

training an initial segmentation model by the training sample set to obtain the semantic segmentation model.

In a preferred embodiment, in the system 1 for obtaining mask frame data, step of training an initial segmentation model by the training sample set to obtain the semantic segmentation model includes:

obtaining a corresponding object region recognition result by inputting the training sample set into an initial segmentation model, and updating the parameter value of the initial segmentation model;

obtaining the semantic segmentation model until the training of the initial segmentation model is completed.

In a preferred embodiment, in the system 1 for obtaining mask frame data, the identifying unit 11 further can identify the main area of the at least one frame image by an instance segmentation model.

In a preferred embodiment, in the system 1 for obtaining mask frame data, the extraction module includes: a feature extraction module and a region extraction module;

the extraction module includes: a feature extraction module and a region extraction module.

In a preferred embodiment, in the system 1 for obtaining mask frame data, the step of identifying the main area of the at least one frame image by the identifying unit 11 using an instance segmentation model includes:

extracting a feature map of the at least one frame image of the video by the feature extraction module;

extracting a candidate area from the feature map by performing non-maximum suppression through the region extraction module, and generating a target area feature map according to the feature map and the candidate area;

predicting the target area feature map to obtain a category by the classification module;

predicting frame position information of the target area feature map through the regression module;

calculating a segmentation mask of the target area feature map by the mask module;

obtaining the main area according to the category, the frame position information, and the segmentation mask.

In a preferred embodiment, in the system 1 for obtaining mask frame data, the step of generating mask frame data according to the main area by the generating unit 12 includes:

the generating unit 12 generates the mask frame data according to a width and a height of the main area and a corresponding time stamp of the frame image in the video.

Figure 14:
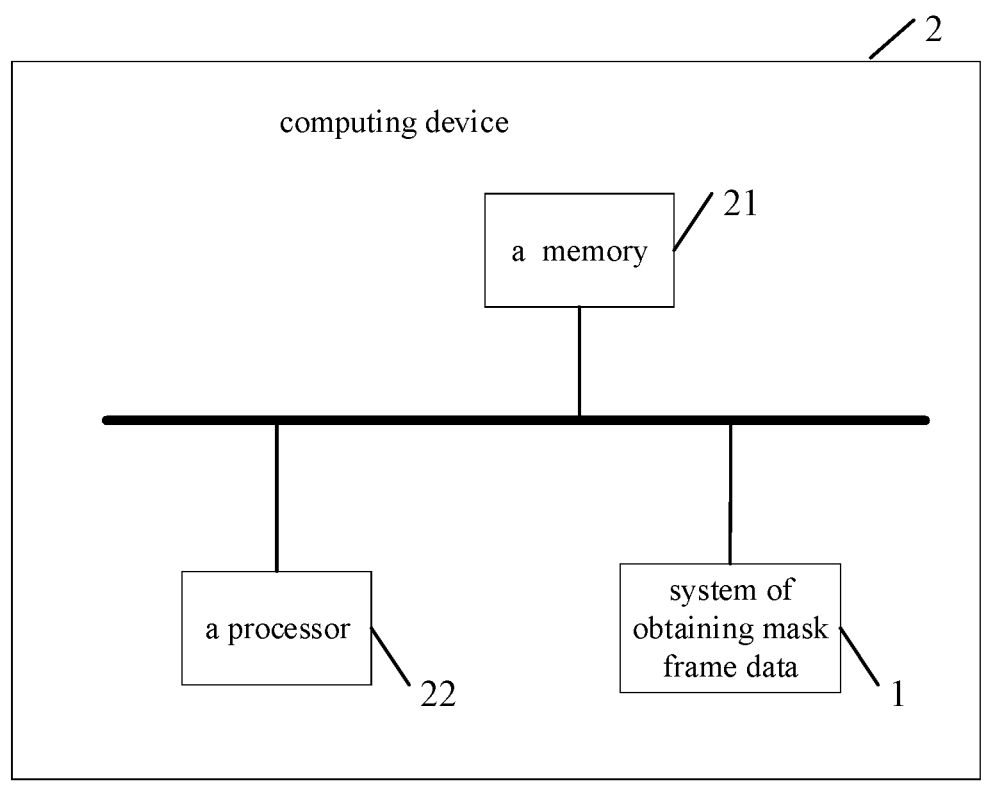
FIG. 14 illustrates a diagram of hardware architecture of a computing device for implementing the method of obtaining mask frame data of the present invention.

As shown in FIG. 14, a computing device 2, the computing device 2 includes:

a memory 21 is configured to store executable program code; and a processor 22 is configured to call the executable program code in the memory 21, and implement the above steps of the method of obtaining mask frame data.

In the FIG. 14, the processor 22 is taken as an example.

As a non-volatile computer readable storage medium, the storage 21 can be used to store a non-volatile software program, a non-volatile computer executable program, and modules, such as program instructions or modules corresponding to a method of obtaining mask frame data in an embodiment of the present application. The processor 22 executes various functional applications and data processing by carrying out the non-volatile software programs, instructions, and modules stored in the storage 21, realizing the method of obtaining mask frame data implemented in the foregoing method embodiments.

The storage 21 may include a program storage area and a data storage area, wherein the program storage area stores an operating system and an application program required for at least one function; the data storage area can store a user's playback information in the computing device 2. In addition, the storage 21 may include a high-speed random access memory, and further includes a non-volatile storage, such as at least one magnetic disk storage device, a flash memory device, or other non-volatile solid-state storage device. In some embodiments, the storage 21 optionally includes a storage 21 remotely set relative to processor 22, and these remote storages 21 can be connected to the system 1 for obtaining mask frame data through a network. Examples of the above network include, but are not limited to, the Internet, an intranet, a local area network, a mobile communication network, and combinations thereof.

The one or more modules are stored in the storages 21, and when executed by the one or more processors 22, the one or more modules implement the method of obtaining mask frame data in any of the above method embodiments, such as implement the method steps in FIGS. 2 to 5 described above, and implement functions of the system 1 of obtaining mask frame data.

The above products can execute the methods provided in the embodiment of the present application, and has corresponding function modules and beneficial effects when implementing the methods. For technical details that are not described in detail in this embodiment, can be referred to the methods provided in the embodiments of the present application.

The computing device 2 in the embodiment of the present application exists in various forms, including but not limited to:

First, mobile communication equipment: a characteristic of such equipment is having mobile communication functions, and a main goal is to provide voice and data communication. Such terminals include smart phones (such as iPhone), multimedia phones, feature phones, and low-end phones, and so on.

Second, ultra-mobile personal computer equipment: such equipment belongs to a category of personal computers, has computing and processing functions, and generally has characteristics of mobile Internet access. Such terminals include PDA, MID, and UMPC devices and so on, such as iPad.

Third, portable entertainment equipment: such equipment can display and play multimedia contents. Such equipment includes audio and video players (such as iPods), handheld game consoles, e-books, smart toys, portable car navigation devices, and so on.

Forth, server: is a device providing computing services. The composition of the server includes a processor, hard disk, memory, system bus, and so on. The server and general computer are similar in architecture. However, due to a demand for providing highly reliable services, the server has higher requirements in terms of processing power, stability, reliability, security, scalability, manageability and other aspects.

Fifth, other electronic devices with data interaction function.

An embodiment of the present application provides a non-volatile computer readable storage medium, the computer readable storage medium stores computer executable instructions, and the computer executable instructions are executed by one or more processors, such as a processor 22 in FIG. 14, so the above one or more processors 22 may execute the method of obtaining mask frame data in any of the above method embodiments, for example, execute the method steps in FIG. 2 to 5 described above, and execute functions of the system 1 of obtaining mask frame data.

The embodiments of device described above are only schematic, and the units described as separate components may or may not be physically separated, and components displayed as units may or may not be physical units, that is, the components displayed as units may be located in one place, or can be distributed to at least two network elements. Part or all of modules may be selected according to actual demands to achieve the solutions in the embodiments of the present application. Those of ordinary skill in the art can understand and implement without creative labor or efforts.

Through the description of the above embodiments, those of ordinary skill in the art can clearly understand that the embodiments can be implemented by means of software plus a general hardware platform, of course, can also be implemented by hardware. Those of ordinary skill in the art can understand that all or part of processes in the method of the foregoing embodiments can be completed by using a computer program to instruct related hardware. The program can be stored in a computer-readable storage medium. While the program is executed, the processes of the embodiments of the methods described above may be included. The storage medium may be a magnetic disk, an optical disk, a read-only memory (ROM), or a random access memory (RAM), and so on.

Embodiment 1

The method of obtaining mask frame data can be applied to an offline on-demand video scene. In the server, the main area of each frame image in the video is identified to generate the mask file structure including the mask frame data segment. When the client requests the server to play the video file, the identification unit and the index unit is obtained, the index unit is searched according to the video timestamp of a current video file, a physical address of the mask frame data segment corresponding to the current playing time is obtained, and the mask frame data segment is requested from the server according to the physical address. According to the client's request, the server sends the corresponding mask frame data segment to the client. The client renders the mask frame data and draws the processed mask frame data and the bullet screen information into the corresponding video frame image. So that, the bullet screen information is displayed in an area other than another area corresponding to the mask frame data, so as to avoid the main area in the video being covered during playing to improve the user's viewing effect.

Embodiment 2

The method of obtaining mask frame data can be applied to an offline on-demand anime. In the server, animated characters of each frame image in a video is identified to generate the mask file structure including the mask frame data segment. When the client requests the server to play the video file, the identification unit and the index unit is obtained, the index unit is searched according to the video timestamp of a current video file, a physical address of the mask frame data segment corresponding to the current playing time is obtained, and the mask frame data segment is requested from the server according to the physical address. According to the client's request, the server sends the corresponding mask frame data segment to the client. The client renders the mask frame data and draws the processed mask frame data and the bullet screen information into the corresponding video frame image. So that, the bullet screen information is displayed in an area out of the animated characters, so as to avoid the main area in the video being covered during playing to improve the user's viewing effect.

Finally, it should be noted that the above embodiments are only used to describe technical solutions of the present application, rather than limiting it. Although the present application has been described in detail with reference to the foregoing embodiments, those of ordinary skill in the art should understand: the technical solutions described in the foregoing embodiments can still be modified, or some or all of the technical features can be equivalently replaced, and these modifications or replacements do not make essence of corresponding technical solutions outside the scope of the technical solutions of the embodiments of the present application.

What is claimed is:

1. A method of presenting bullet screens based on a mask frame data corresponding to video frames, comprising:
    obtaining a frame of a video;
    identifying a main area of the frame using an image segmentation algorithm; and
    generating a mask frame data segment corresponding to the frame based on the main area of the frame, wherein the generating a mask frame data segment corresponding to the frame based on the main area of the frame further comprises generating the mask frame data segment based on a timestamp of the frame in the video, a width and a height of the main area of the frame, wherein the generating a mask frame data segment corresponding to the frame based on the main area of the frame further comprises converting the main area into contour data, compressing pixel resolution of the contour data to a predetermined pixel resolution range, compressing color bit depth of the contour data to a predetermined binary bit, performing an edge feather processing on the contour data, and generating the mask frame data segment based on the contour data; and
    presenting bullet screens in areas outside the main area of the frame using the generated mask frame data segment.

2. The method of claim 1, wherein the identifying a main area of the frame using an image segmentation algorithm further comprises identifying the main area of the frame by a semantic segmentation model, and the semantic segmentation model comprises at least two feature extraction models, at least one feature enhancement layer, and a classification layer.

3. The method of claim 2, wherein before the identifying the main area of the frame by a semantic segmentation mode, the method further comprises:
    obtaining at least one first sample image, wherein the at least one first sample image is an object image including at least one of a human being or an animal;
    obtaining at least one second sample image, wherein the at least one second sample image is a background image excluding human beings and animals;
    extracting an object area in the object image;
    synthesizing the object area and the background image and generating a training sample set; and
    training an initial segmentation model using the training sample set and obtaining the semantic segmentation model.

4. The method of claim 1, wherein the identifying a main area of the frame using an image segmentation algorithm further comprises identifying the main area of the frame by an instance segmentation model.

5. The method of claim 4,
    wherein the instance segmentation model comprises an extraction module, a classification module, a regression module, and a mask module; and
    wherein the extraction module comprises a feature extraction module and a region extraction module.

6. The method of claim 5, further comprising:
    extracting a feature map of the frame by the feature extraction module;
    extracting a candidate area from the feature map by performing non-maximum suppression by the region extraction module;
    generating a target area feature map based on the feature map and the candidate area;
    obtaining a category by the classification module based on the target area feature map;
    determining position information of boundaries of the target area feature map by the regression module;
    calculating a segmentation mask of the target area feature map using the mask module; and
    obtaining the main area based on the category, the position information of boundaries, and the segmentation mask.

7. The method of claim 1, further comprising:
    representing each pixel in the main area by a color value and obtaining a set of mask frame data in a Bitmap format; and
    generating the mask frame data segment comprising the set of mask frame data.

8. The method of claim 1, further comprising:
    generating a mask frame file corresponding to the video, wherein the mask frame file comprises an identification unit, an index unit, and a plurality of mask frame data segments corresponding to a plurality of frames of the video.

9. A computing system of presenting bullet screens based on mask frame data corresponding to video frames, comprising:
    at least one processor; and
    at least one memory communicatively coupled to the at least one processor and storing instructions that upon execution by the at least one processor cause the computing system to:
    obtain a frame of a video;
    identify a main area of the frame using an image segmentation algorithm; and
    generate a mask frame data segment corresponding to the frame based on a timestamp of the frame in the video, a width and a height of the main area of the frame, wherein generating a mask frame data segment corresponding to the frame based on the main area of the frame further comprises converting the main area into contour data, compressing pixel resolution of the contour data to a predetermined pixel resolution range, compressing color bit depth of the contour data to a predetermined binary bit, performing an edge feather processing on the contour data, and generating the mask frame data segment based on the contour data; and present bullet screens in areas outside the main area of the frame based on the generated mask frame data segment.

10. The computing system of claim 9, the at least one memory further storing instructions that upon execution by the at least one processor cause the computing system to:
identify the main area of the frame by a semantic segmentation model, wherein the semantic segmentation model comprises at least two feature extraction models, at least one feature enhancement layer, and a classification layer.

11. The computing system of claim 10, the at least one memory further storing instructions that upon execution by the at least one processor cause the computing system to:
obtain at least one first sample image, wherein the at least one first sample image is an object image including at least one of a human being or an animal;
obtain at least one second sample image, wherein the at least one second sample image is a baCkground image excluding human beings and animals;
extract an object area in the object image;
synthesize the object area and the background image and generate a training sample set;
train an initial segmentation model using the training sample set; and
obtain the semantic segmentation model.

12. The computing system of claim 9, the at least one memory further storing instructions that upon execution by the at least one processor cause the computing system to:
identify the main area of the frame by an instance segmentation model, wherein the instance segmentation model comprises an extraction module, a classification module, a regression module, and a mask module, and wherein the extraction module comprises a feature extraction module and a region extraction module.

13. The computing system of claim 12, the at least one memory further storing instructions that upon execution by the at least one processor cause the computing system to:
extract a feature map of the frame by the feature extraction module;
extract a candidate area from the feature map by performing non-maximum suppression by the region extraction module;
generate a target area feature map based on the feature map and the candidate area;
obtain a category by the classification module based on the target area feature map;
determine position information of boundaries of the target area feature map by the regression module;
calculate a segmentation mask of the target area feature map using the mask module; and
obtain the main area based on the category, the position information of boundaries, and the segmentation mask.

14. The computing system of claim 9, the at least one memory further storing instructions that upon execution by the at least one processor cause the computing system to:
represent each pixel in the main area by a color value and obtaining a set of mask frame data in a Bitmap format;
generate the mask frame data segment comprising the set of mask frame data; and
generate a mask frame file corresponding to the video, wherein the mask frame file comprises an identification unit, an index unit, and a plurality of mask frame data segments corresponding to a plurality of frames of the video.

15. A non-transitory computer-readable storage medium bearing computer-readable instructions that upon execution on a computing device cause the computing device at least to:
obtain a frame of a video;
identify a main area of the frame using an image segmentation algorithm; and
generate a mask frame data segment corresponding to the frame based on a timestamp of the frame in the video, a width and a height of the main area of the frame, wherein generating a mask frame data segment corresponding to the frame based on the main area of the frame further comprises converting the main area into contour data, compressing pixel resolution of the contour data to a predetermined pixel resolution range, compressing color bit depth of the contour data to a predetermined binary bit, performing an edge feather processing on the contour data, and generating the mask frame data segment based on the contour data; and
present bullet screens in areas outside the main area of the frame based on the generated mask frame data segment.

16. The non-transitory computer-readable storage medium of claim 15, further comprising computer-readable instructions that upon execution on the computing device cause the computing device at least to:
identify the main area of the frame by an instance segmentation model, wherein the instance segmentation model comprises an extraction module, a classification module, a regression module, and a mask module, and the extraction module comprises a feature extraction module and a region extraction module;
extract a feature map of the frame by the feature extraction module;
extract a candidate area from the feature map by performing non-maximum suppression by the region extraction module;
generate a target area feature map based on the feature map and the candidate area;
obtain a category by the classification module based on the target area feature map;
determine position information of boundaries of the target area feature map by the regression module;
calculate a segmentation mask of the target area feature map using the mask module; and
obtain the main area based on the category, the position information of boundaries; and the segmentation mask.

* * * * *